US012025293B2

(12) United States Patent
Li et al.

(10) Patent No.: US 12,025,293 B2
(45) Date of Patent: Jul. 2, 2024

(54) LED LAMP CAP

(71) Applicant: Zhejiang Yankon Group. Co., Ltd., Zhejiang (CN)

(72) Inventors: Yang Li, Zhejiang (CN); Huanliang Wang, Zhejiang (CN); Tingyu Liang, Zhejiang (CN); Hui Ge, Zhejiang (CN); Bin Yu, Zhejiang (CN)

(73) Assignee: Zhejiang Yankon Group. Co., Ltd., Zhejiang (CN)

( * ) Notice: Subject to any disclaimer, the term of this patent is extended or adjusted under 35 U.S.C. 154(b) by 0 days.

(21) Appl. No.: 18/094,998

(22) Filed: Jan. 10, 2023

(65) Prior Publication Data

US 2024/0159380 A1 May 16, 2024

(30) Foreign Application Priority Data

Nov. 10, 2022 (CN) ........................ 202211403446.X

(51) Int. Cl.

*F21V 17/06* (2006.01)
*F21V 23/04* (2006.01)
*F21V 23/06* (2006.01)
*F21V 31/00* (2006.01)
*F21Y 115/10* (2016.01)

(52) U.S. Cl.

CPC .............. *F21V 17/06* (2013.01); *F21V 23/04* (2013.01); *F21V 23/06* (2013.01); *F21V 31/005* (2013.01); *F21Y 2115/10* (2016.08)

(58) Field of Classification Search

CPC .......... F21V 17/06; F21V 23/04; F21V 23/06; F21V 31/005; F21Y 2115/10
See application file for complete search history.

(56) References Cited

U.S. PATENT DOCUMENTS

| | | | | |
|---|---|---|---|---|
| 5,113,318 | A * | 5/1992 | Conley | F21V 33/0044 362/372 |
| 6,445,132 | B1 * | 9/2002 | Ford | H05B 47/17 362/186 |
| 7,585,187 | B2 * | 9/2009 | Daily | F21V 19/0025 362/640 |
| 8,608,366 | B2 * | 12/2013 | Wang | F21K 9/23 362/800 |
| 8,646,951 | B2 * | 2/2014 | Kim | H01R 33/94 362/148 |
| 10,184,642 | B2 * | 1/2019 | Geels | F21V 19/001 |
| 11,499,702 | B1 * | 11/2022 | Suslow | F21S 8/02 |
| 2006/0139907 | A1 * | 6/2006 | Yen | H05B 45/20 362/85 |
| 2009/0075519 | A1 * | 3/2009 | Daily | F21V 19/0025 439/620.02 |

(Continued)

*Primary Examiner* — Evan P Dzierzynski
(74) *Attorney, Agent, or Firm* — Samson G. Yu

(57) ABSTRACT

Some embodiments of the present disclosure provide a Light Emitting Diode (LED) lamp cap, the LED lamp cap includes a metal casing and an adjusting part, the adjusting part includes an adjusting member disposed on the upper part of the metal casing and a connecting part disposed in the metal casing, the adjusting member is connected with a switch through the connecting part, and the connecting part is configured for rotating by rotating the adjusting member so as to change a gear of the switch to adjust color temperature or brightness or timing or sensing of an LED light source.

19 Claims, 8 Drawing Sheets

(56) References Cited

U.S. PATENT DOCUMENTS

| | | | | |
|---|---|---|---|---|
| 2012/0002426 A1* | 1/2012 | Wang | F21K 9/23 | 362/373 |
| 2014/0321112 A1* | 10/2014 | Huang | F21K 9/232 | 362/230 |

* cited by examiner

LED LAMP CAP

CROSS-REFERENCE TO RELATED APPLICATIONS

The present disclosure claims priority to Chinese Patent Application No. 202211403446.X, filed on Nov. 10, 2022 and entitled“LED Lamp Cap”, the contents of which are hereby incorporated by reference in its entirety.

TECHNICAL FIELD

The disclosure belongs to a technical field of a Light Emitting Diode (LED) lamp cap, and particularly relates to an LED lamp cap.

BACKGROUND

A LED light source known to inventors usually can only emit light with a single brightness or color, and in order to realize a dimming or color-adjusting function, a dimming or color-adjusting switch is usually disposed on a lamp body. For example, a switch hole is formed in a lamp body of a bulb lamp, a Parabolic Aluminum Reflector (PAR) lamp or a Backscattered Radiation (BR) lamp, an adjusting switch is disposed in the lamp body, a switch panel is disposed outside the lamp body, the switch panel passes through a switch hole to be connected with the adjusting switch, and the brightness or color temperature of the lamp is adjusted by adjusting the switch panel. For another example, for a filament lamp, in order to realize the dimming or color-adjusting function, a plastic connecting member is disposed between a bulb shell and a lamp cap, a switch adjusting member is disposed outside the plastic connecting member, an adjusting switch is disposed on a driving power supply, the switch adjusting member is connected with the adjusting switch, and a position of the adjusting switch is changed by adjusting the switch adjusting member to adjust the brightness or color temperature. Besides, there will be a switch on the lamp body for timing control or sensing control.

On one hand, the arrangement of the switch can destroy the appearance structure of the lamp body or the whole lamp, increase the production difficulty and influence the integral attractiveness; and on the other hand, for a light source which needs to be waterproof when being installed outdoors, such as a PAR lamp, the PAR lamp cannot be waterproof due to the arrangement of the switch on the lamp body, so that the PAR lamp cannot be applied to outdoor places which need to be waterproof.

SUMMARY

Aiming at the technical problems existing in the art known to inventors, some embodiments of the present disclosure provide an LED lamp cap.

The technical problems of the disclosure are mainly solved through the following technical solution: an LED lamp cap includes a metal casing and an adjusting part, the adjusting part includes an adjusting member disposed on the upper part of the metal casing and a connecting part disposed in the metal casing, the adjusting member is connected with a switch through the connecting part, and the connecting part is configured for rotating by rotating the adjusting member so as to change a gear of the switch to adjust the color temperature or brightness or timing or sensing.

In some embodiments, one end of the adjusting member is connected with one end of the connecting part, and the other end of the connecting part is connected with a switch handle of the switch.

In some embodiments, the switch handle of the switch is transversely placed, the other end of the connecting part is disposed with a notch, and the switch handle of the switch is inserted into the notch.

In some embodiments, the switch handle of switch is vertically placed, the switch handle of the switch is sleeved with an adapter, the upper end of adapter is provided with a groove for inserting the other end of the connecting part, and the lower end of the adapter is provided with a cavity for sleeving the switch handle of the switch.

In some embodiments, the LED lamp cap includes a mounting column and a mounting plate, one end of the adjusting member is connected with the mounting column, the connecting part is connected with the mounting plate, and the adjusting member is connected with the connecting part in a manner that the mounting column is connected with the mounting plate.

In some embodiments, the mounting plate is provided with a via hole matched with one end of the mounting column, and the mounting column is connected with the mounting plate by inserting one end of the mounting column to the via hole.

In some embodiments, the connecting part is provided with an inserting groove, and the switch handle of the switch is vertically placed and inserted into the inserting groove.

In some embodiments, the LED lamp cap includes a mounting part disposed in the metal casing, wherein a first mounting hole is disposed in an outer wall of one end of the mounting part, and the connecting part passes through the first mounting hole and is configured for rotating along the first mounting hole.

In some embodiments, one end of the adjusting member is provided with a plurality of clamping parts, a plurality of second mounting holes are disposed in the outer wall of one end of the mounting part; the plurality of clamping parts are disposed in one-to-one correspondence with the plurality of second mounting holes; an end portion of each of the plurality of clamping parts passes through a corresponding second mounting hole and is abutted against an inner wall of one end of the mounting part, and the plurality of clamping parts are configured for rotating along the plurality of second mounting holes.

In some embodiments, one end of the adjusting member is provided with a clamping part, a second mounting hole is disposed in the outer wall of one end of the mounting part, an end portion of the clamping part passes through the second mounting hole and is abutted against an inner wall of one end of the mounting part, the clamping part is configured for rotating along the second mounting hole, the connecting part is provided with a clamping block, and the clamping block is abutted against the inner wall of one side of the mounting part.

In some embodiments, the LED lamp cap includes a rivet, a center of one end of the mounting part is provided with a protrusion for mounting the rivet, the protrusion is provided with a first through hole, and the rivet is mounted on the mounting part by inserting a lower end of the rivet into the first through hole.

In some embodiments, a plurality of first ribs protruded relative to an inner wall of the first through hole are disposed on the inner wall of the first through hole in a circumferential inward symmetrical mode, and the plurality of first ribs are vertically disposed.

In some embodiments, the mounting part is mounted in the metal casing in an interference fit manner.

In some embodiments, a plurality of second ribs protruded relative to an outer side wall of the mounting part are disposed on the outer side wall of the mounting part in a circumferential outward symmetrical mode, and the plurality of second ribs are vertically disposed.

In some embodiments, the outer side wall of the mounting part is provided with an external thread, and the mounting part is mounted in the metal casing by screwing the external thread with an internal thread in the metal casing.

In some embodiments, the outer side wall of the adjusting member is provided with an indicating arrow, the metal casing is provided with identifying marks for identifying color temperature or brightness or timing or sensing, and the indicating arrow is corresponded to the identifying marks.

In some embodiments, the switch is mounted on a drive power strip or on an adapter plate that is electrically connected with the drive power strip by a pin or wire.

The disclosure has the beneficial effects that: the adjusting member is disposed on the upper part of the metal casing of the lamp cap and is connected with the switch through the connecting part, and the connecting part is enabled to rotate by rotating the adjusting member so as to change the gear of the switch to adjust the color temperature or brightness or timing or sensing of the LED light source; since the adjusting part is disposed on the lamp cap to form a whole, the appearance structure of the lamp body or the whole lamp cannot be destroyed, and meanwhile, the light source requiring outdoor lighting can also be waterproof.

Figure 1:
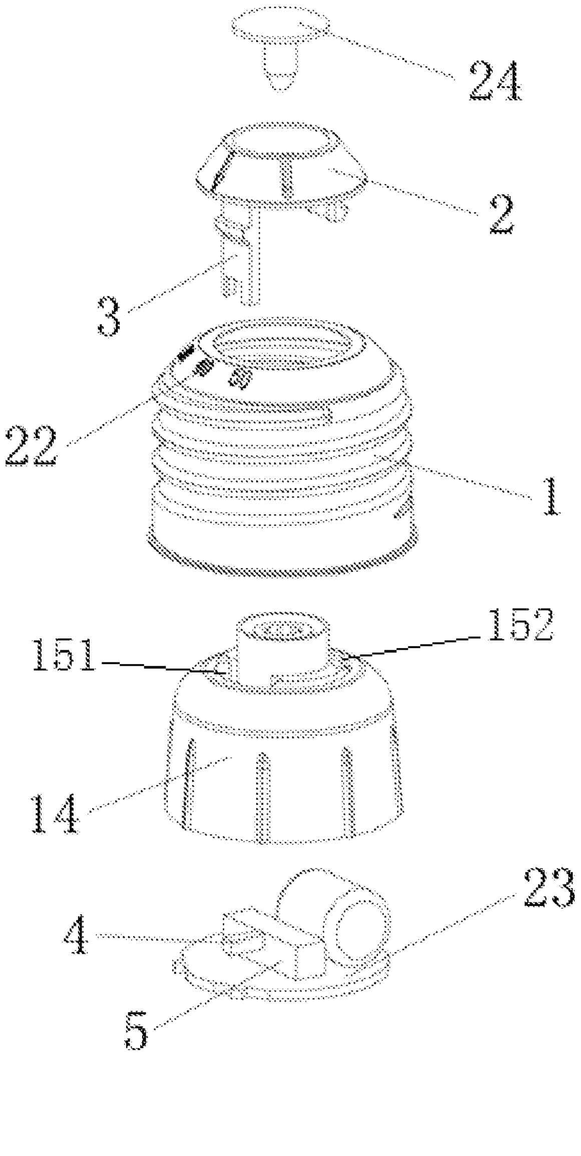
FIG. 1 illustrates a schematic structure diagram of an exploded view in which an adjusting member and a connecting part are in a whole of the disclosure.

In the drawings: 1. metal casing; 2. adjusting member; 3. connecting part; 4. switch handle; 5. switch; 6. notch; 7. adapter; 8. groove; 9. cavity; 10. mounting column; 11. mounting plate; 12. via hole; 13. inserting groove; 14. mounting part; 15. mounting hole; 151. first mounting hole; 152. second mounting hole; 16. clamping part; 17. clamping block; 18. first rib; 19. second rib; 20. external thread; 21. indicating arrow; 22. identifying mark; 23. drive power strip; 24. rivet; 25. longitudinal groove; 26. protrusion; 27. first through hole; and 28. second through hole.

DETAILED DESCRIPTION OF THE EMBODIMENTS

The technical solutions of the disclosure will be further described in detail below through embodiments with reference to drawings.

Some embodiments of the present disclosure provide a LED lamp cap, as shown in FIGS. 1-16, the LED lamp cap includes a metal casing 1, a mounting part 14 disposed in the metal casing 1, a rivet 24 disposed on the mounting part 14, and an adjusting part, the adjusting part includes an adjusting member 2 disposed on the upper part of the metal casing 1 and a connecting part 3 disposed in the mounting part 14 mounted in the metal casing 1, the adjusting member 2 is connected with a switch 5 through the connecting part 3, and the connecting part 3 is configured for rotating by rotating the adjusting member 2 so as to change a gear of the switch 5 to adjust the color temperature or brightness of an LED light source.

In some embodiments, the switch 5 can be directly mounted on a drive power strip 23 of the LED light source and is electrically connected with the drive power strip 23; or the switch 5 can be independently mounted on an adapter plate that is electrically connected with the drive power strip by a pin or wire. When the switch 5 is directly mounted on the drive power strip 23, it can be transversely placed or vertically placed according to a position of the drive power strip 23 such that a switch handle 4 of the switch 5 is transversely placed or vertically placed. The switch 5 is a shift switch or is another adjusting switch.

In some embodiments, the adjusting part and the mounting part 14 are made of an insulating material. As shown in FIGS. 4-7, the mounting part 14 is of a cylindrical structure that is matched with the metal casing 1, and is closed at one end and open at the other end to form an accommodating cavity, the center of one end of the mounting part 14 is provided with a protrusion 26 for mounting the rivet 24, and the protrusion 26 is of a cylindrical structure and is provided with a first through hole 27 that communicates with the accommodating cavity of the mounting part 14. The metal casing 1 is a hollow structure with open top and bottom, and when the mounting part 14 is mounted in the metal casing 1, the protrusion 26 on the mounting part 14 passes through the upper opening of the metal casing 1 and extends above the metal casing 1, and the rivet 24 is mounted on the protrusion 26 of the mounting part 14 by inserting the lower end of the rivet 24 into the first through hole 27. In order to prevent loosening of the rivet 24, a plurality of first ribs 18 protruded relative to an inner wall of the first through hole 27 are disposed on the inner wall of the first through hole 27 in a circumferential inward symmetrical mode, and the plurality of first ribs 18 are vertically disposed. The lower end of the rivet 24 can be clamped by clamping fit between the first ribs 18, so that the rivet 24 is prevented from disengaging from within the first through hole 27; and meanwhile, a gap between two adjacent first ribs 18 is configured for routing of an incoming live wire and is electrically connected with the lower end of the rivet 24.

The outer wall of one end of the mounting part 14 is provided with a plurality of mounting holes 15 located at the periphery of the protrusion 26, each of the plurality of the mounting holes 15 is of an arc-shaped structure. The plurality of mounting holes 15 include a first mounting hole 151 and a second mounting hole 152.

The adjusting member 2 is of a hollow circular truncated cone structure, and the adjusting member 2 is in integral connection or in split connection with the connecting part 3.

When the adjusting member 2 is in integral connection with the connecting part 3, that is, when one end of the adjusting member 2 is connected with one end of the connecting part 3 to form a whole, the connecting part 3 is of an arc-shaped structure adapting to the first mounting hole 151, the other end of the connecting part 3 passes through the first mounting hole 151 on the mounting part 14 to be connected with the switch handle 4 of the switch 5, and the switch 5 and the drive power strip 23 are both located in the accommodating cavity at the other end of the mounting part 14.

Figure 2:
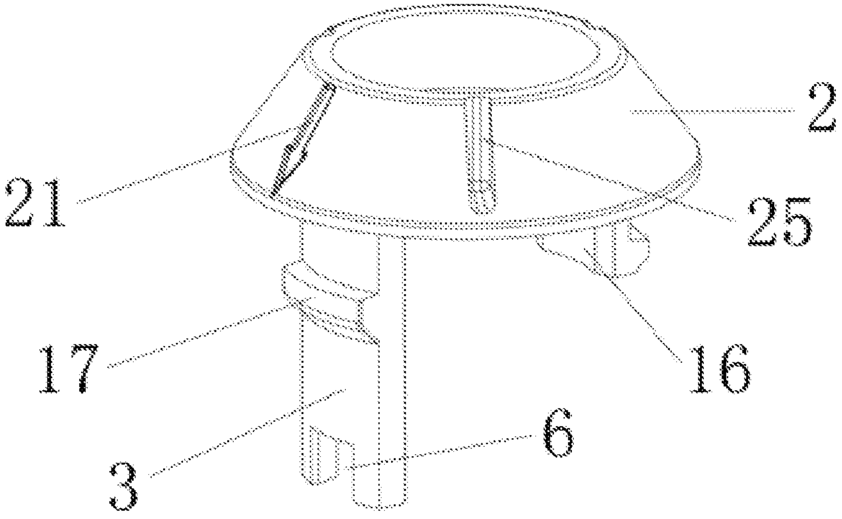
FIG. 2 illustrates a schematic structure diagram of an adjusting member of the disclosure.
Figure 3:
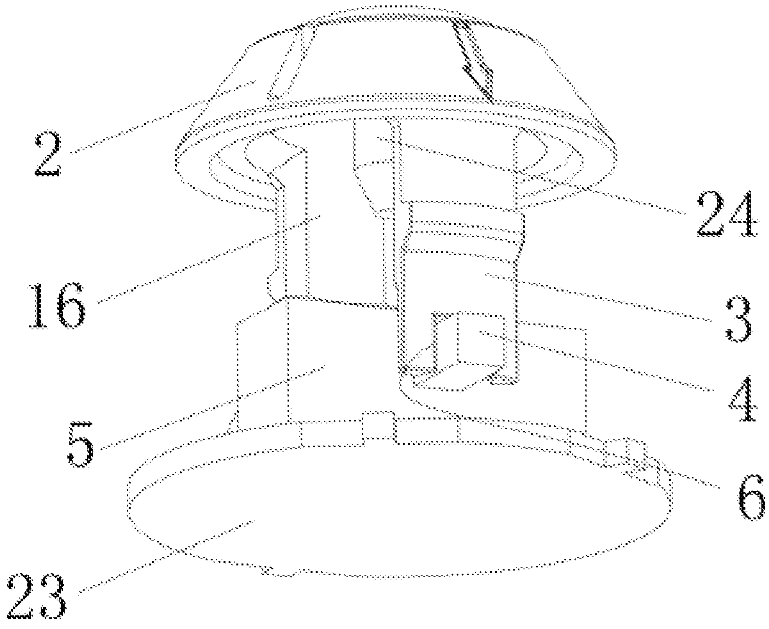
FIG. 3 illustrates a schematic structure diagram of connection of an adjusting member, a connecting part and a switch handle of the disclosure.
Figure 7:
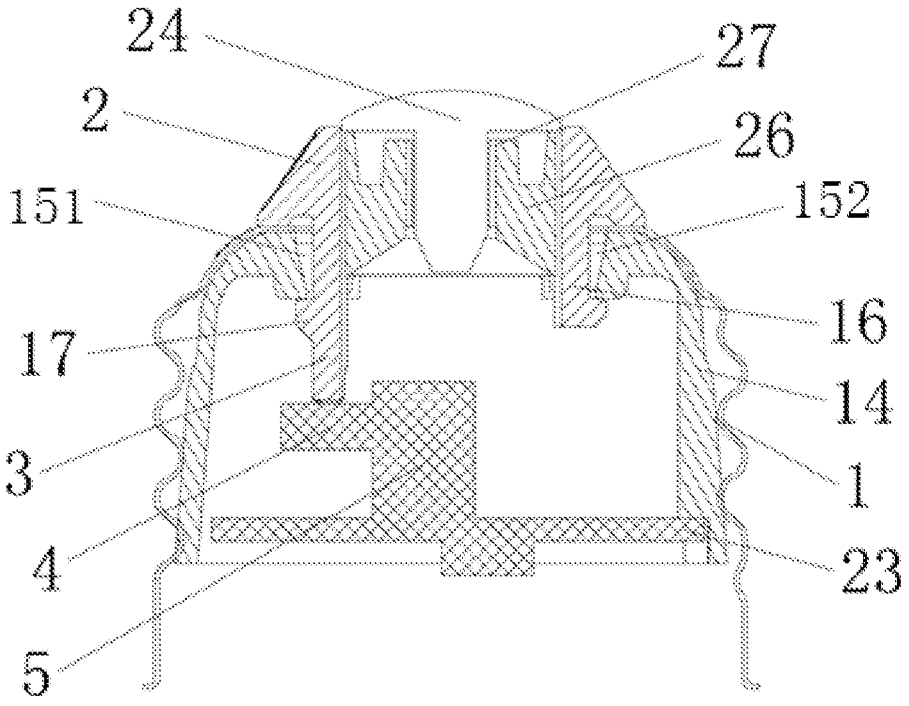
FIG. 7 illustrates a schematic structure diagram of a cross-sectional view in which an adjusting member and a connecting part are in a whole of the disclosure.
Figure 8:
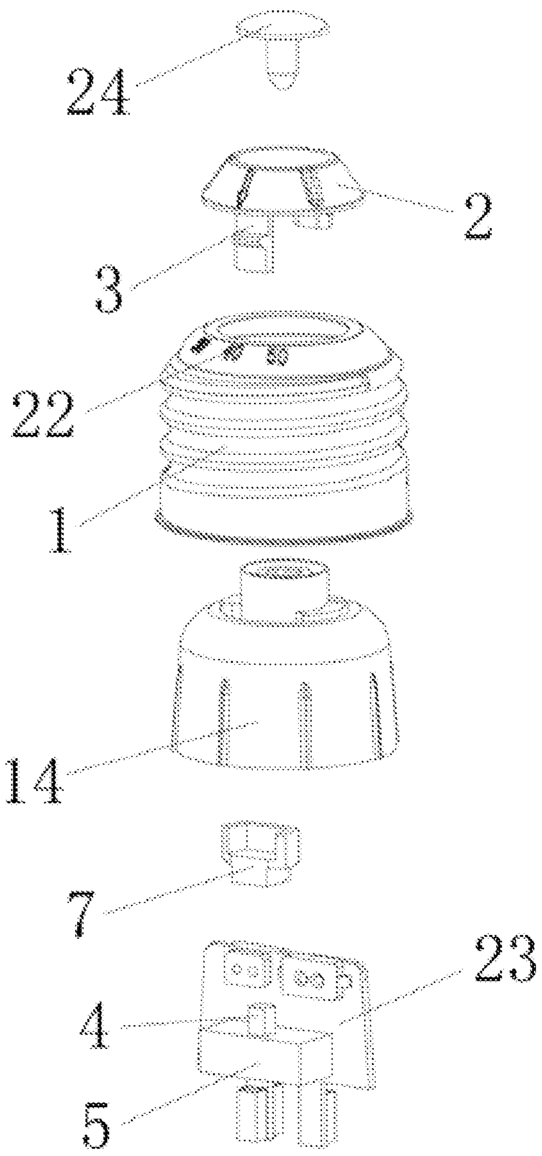
FIG. 8 illustrates another schematic structure diagram of an exploded view in which an adjusting member and a connecting part are in a whole of the disclosure.

As shown in FIGS. 2, 3 and 7, when the switch handle 4 of the switch 5 is transversely placed, the other end of the connecting part 3 is of a reverse-U-shaped structure and forms a notch 6, and the notch 6 is configured for inserting the switch handle 4 of the switch 5. When the adjusting part 2 rotates, the connecting part 3 rotates along the first mounting hole 151, the position of the switch handle 4 on the switch 5 is changed by toggling the switch handle 4 of the switch 5 by utilizing the notch 6, so that the gear of the switch 5 is adjusted, and the color temperature or brightness of the LED light source is adjusted.

When the switch handle 4 of the switch 5 is placed vertically, because the side spacing of the switch handle 4 of the switch 5 is small, in order to prevent the disengaging phenomenon after the notch 6 of the reverse-U-shaped structure at the other end of the connecting part 3 inserts the switch handle 4, an adapter 7 is added.

Figure 9:
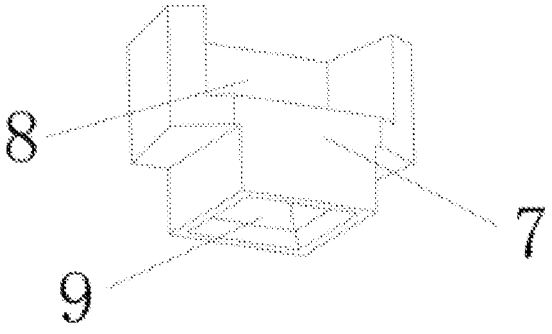
FIG. 9 illustrates a schematic structure diagram of an adapter of the disclosure.
Figure 10:
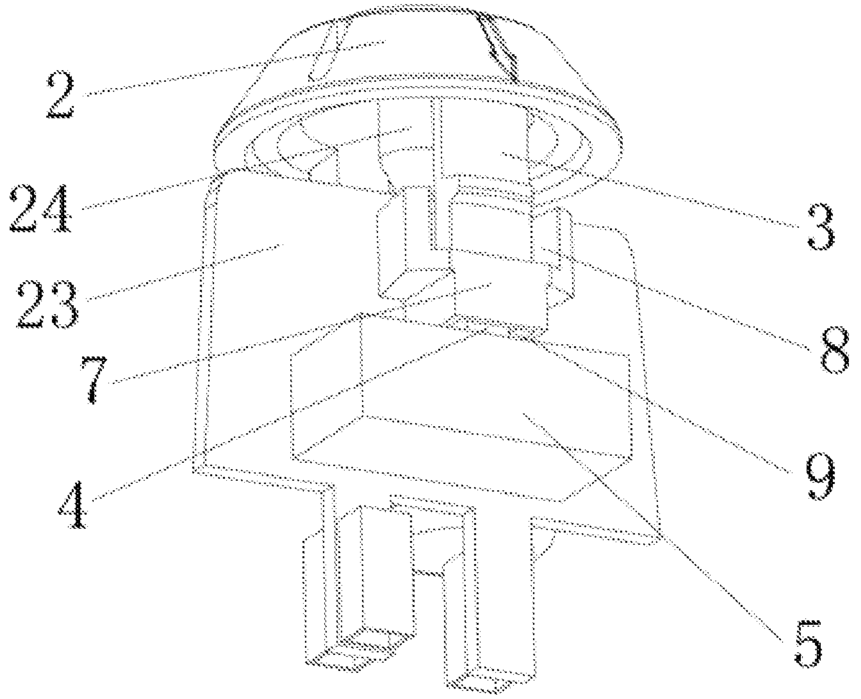
FIG. 10 illustrates a schematic structure diagram of connection of a connecting part, an adapter and a switch handle of the disclosure.
Figure 11:
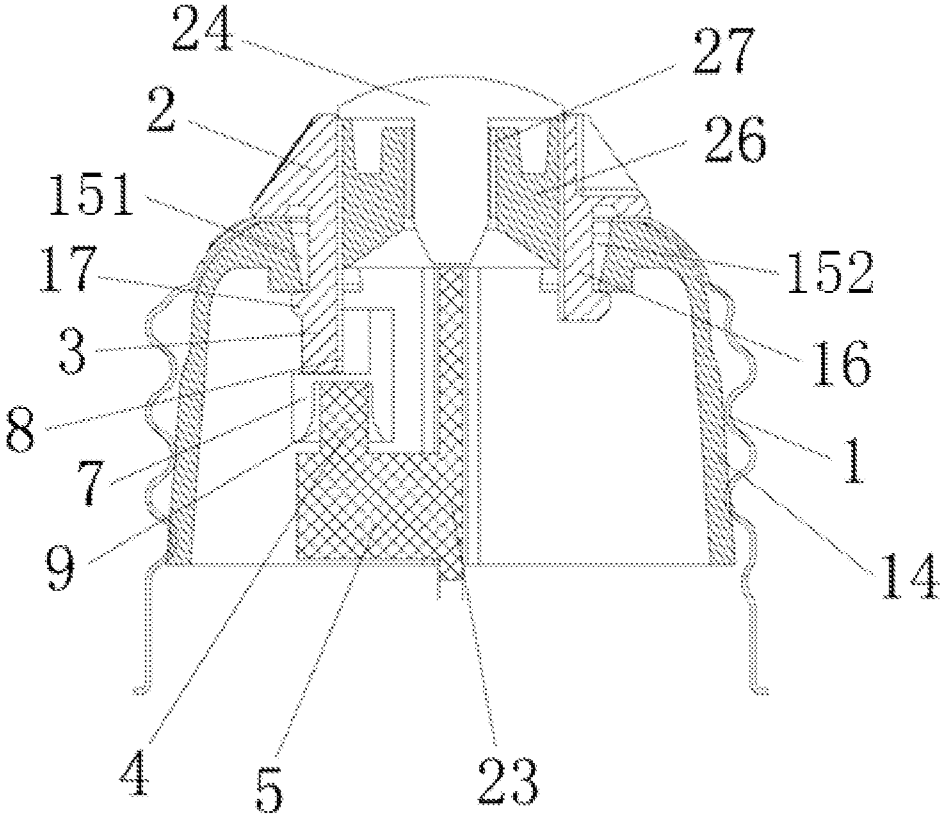
FIG. 11 illustrates another schematic structure diagram of a cross-sectional view in which an adjusting member and a connecting part are in a whole of the disclosure.
Figure 12:
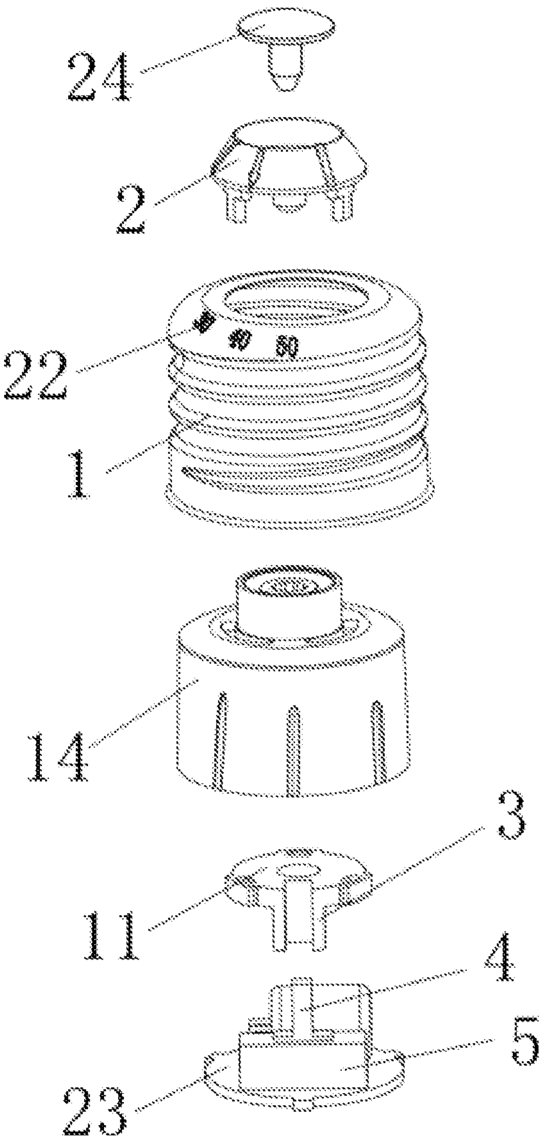
FIG. 12 illustrates a schematic structure diagram of an exploded view in which an adjusting member and a connecting part are split of the disclosure.
Figure 13:
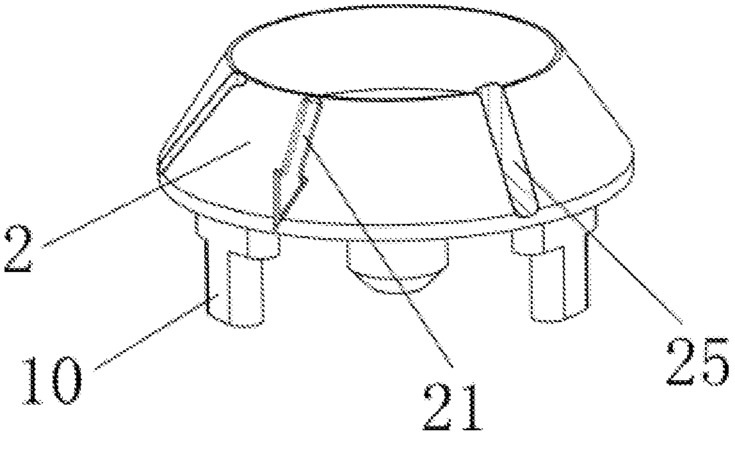
FIG. 13 illustrates another schematic structure diagram of an adjusting member of the disclosure.
Figure 14:
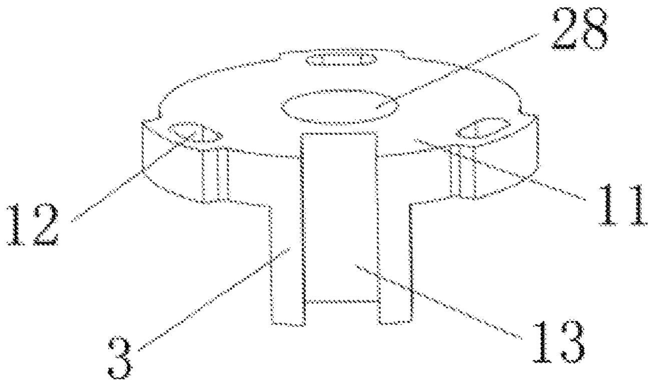
FIG. 14 illustrates a schematic structure diagram of connection of a mounting plate and a connecting part of the disclosure.
Figure 15:
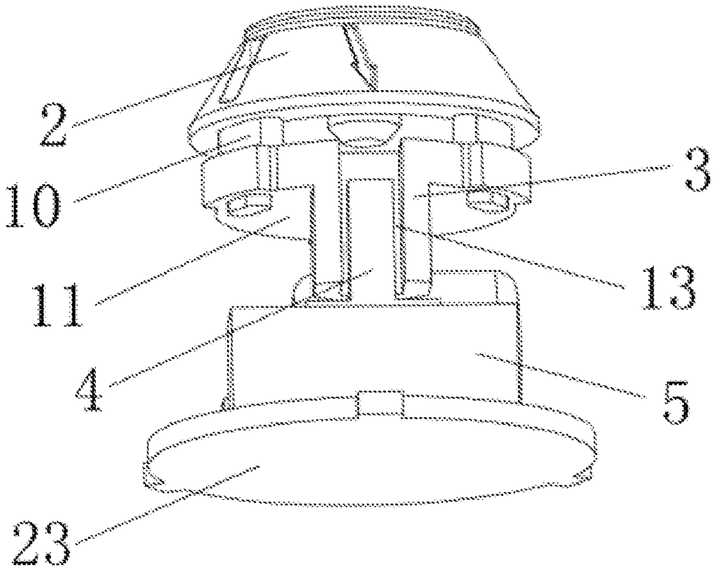
FIG. 15 illustrates another schematic structure diagram of connection of an adjusting member, a connecting part and a switch handle of the disclosure.

As shown in FIGS. 9-11, the upper end of adapter 7 is provided with a groove 8 for inserting the other end of the connecting part 3, and the lower end of the adapter 7 is provided with a cavity 9 for sleeving the switch handle 4 of the switch 5. In the embodiment, the upper end of the adapter 7 is of a square-shaped structure, the groove 8 is located on the square-shaped structure, and the opening and one of the walls of the groove 8 are open; and the lower end of the adapter 7 is of a cylindrical structure on which the cavity 9 is located. Of course, the adapter 7 can also be of other structures, for example, the upper end and lower end of the adapter 7 are disposed as hollow cylindrical structures and other end of connecting part 3 and the switch handle 4 of the switch 5 sleeve the upper and lower hollow cylindrical structures of the adapter 7, respectively.

In use, the other end of the connecting part 3 is inserted into the groove 8 at the upper end of the adapter 7 and the switch handle 4 of the switch 5 sleeves the cavity 9 at the lower end of the adapter 7. When the adjusting member 2 rotates, the connecting part 3 rotates along the first mounting hole 151, the position of the switch handle 4 on the switch 5 is changed by toggling the switch handle 4 of the switch 5 by utilizing the adapter 7, so that the gear of the switch 5 is adjusted, and the color temperature or brightness of the LED light source is adjusted.

As shown in FIGS. 13-16, when the adjusting member 2 is in split connection with the connecting part 3, one end of the adjusting member 2 is connected with the mounting column 10 to form a whole, the connecting part 3 is connected with the mounting plate 11 to form a whole, the connecting part 3, the mounting plate 11, the switch 5 and the drive power strip 23 are all located in the accommodating cavity at the other end of the mounting part 14, and the adjusting member 2 is connected with the connecting part 3 in a manner that the mounting column 10 is connected with the mounting plate 11 after passing through the mounting hole 15 (the first mounting hole 151 or the second mounting hole 152) in the mounting part 14. Specifically as follows.

The mounting plate 11 is provided with a via hole 12 matched with one end of the mounting column 10, and the mounting column 10 is connected with the mounting plate 11 by inserting one end of the mounting column 10 to the via hole 12. The numbers of the mounting column 10 and the mounting hole 15 may be provided as many as desired. In some embodiments, the mounting column 10 and the mounting hole 15 are connected in interference fit to prevent the mounting column 10 from disengaging from the mounting plate 11. The center of the mounting plate 11 is provided with a second through hole 28, and an incoming live wire is electrically connected with the lower end of the rivet 24 after passing through the second through hole 28 and the first through hole 27.

The connecting part 3 is of a groove-shaped structure and forms an inserting groove 13, and the switch handle 4 of the switch 5 is vertically placed and inserted into the inserting groove 13 of the connecting part 3. When the adjusting member 2 rotates, the mounting column 10 rotates along with the adjusting member 2 and drives the mounting plate 11 to synchronously rotate, the mounting plate 11 rotates to enable the connecting part 3 to rotate, meanwhile, the position of the switch handle 4 on the switch 5 is changed by toggling the switch handle 4 of the switch 5 by utilizing the adapter 7, so that the gear of the switch 5 is adjusted, and the color temperature or brightness of the LED light source is adjusted.

When the mounting part 14 is mounted in the metal casing 1, the adjusting member 2 is located above the metal casing 1 with its lower end in abutting against the upper opening of the metal casing 1. As shown in FIGS. 2, 3, 7, 11, when one end of the adjusting member 2 is connected with one end of the connecting part 3 to form a whole, the other end of the connecting part 3 sequentially passes through the upper opening of the metal casing 1 and the first mounting hole 151 on the mounting part 14 and then extends into the accommodating cavity of the mounting part 14 and connects the switch handle 4 of the switch 5 located in the accommodating cavity of the mounting part 14. In such a case, one end of the adjusting member 2 is provided with a clamping part 16, the end portion of the connecting part 16 sequentially passes through the upper opening of the metal casing 1 and the second mounting hole 152 on the mounting part 14 and then extends into the accommodating cavity of the mounting part 14 and is abutted against the inner wall of one end of the mounting part 14. The clamping part 16 rotates along the second mounting hole 152 in the second mounting hole 152. When the adjusting member 2 rotates, the clamping part 16 is driven to rotate synchronously in the second mounting hole 152.

The clamping part 16 can be one or more. When a plurality of clamping parts 16 are available, the connection between the clamping parts 16 and the mounting part 14 is relatively stable by abutment fit between the end portions of the plurality of clamping parts 16, the clamping parts 16 are seldom disengaged from the second mounting holes 152, thereby connecting the adjusting member 2, the metal casing 1 and the mounting part 14 together, and preventing the adjusting member 2 from escaping from the upper opening of the metal casing 1.

When one clamping part 16 is available, the end portion of the clamping part 16 sequentially passes through the upper opening of the metal casing 1 and the second mounting hole 152 on the mounting part 14 and then extends into the accommodating cavity of the mounting part 14 and is abutted against the inner wall of one end of the mounting part 14. Meanwhile, the connecting part 3 is provided with a clamping block 17, which is located in the accommodating cavity of the mounting part 14 and is abutted against the inner wall of one side of the mounting part 14. The connecting part 3 is provided with the clamping block 17 matched with the clamping part 16, the stability of connection between the adjusting member 2 and the mounting part 14 can be improved, the adjusting member 2, the metal casing 1 and the mounting part 14 are connected together, and the adjusting member 2 is prevented from disengaging from the upper opening of the metal casing 1.

As shown in FIGS. 13-16, when the adjusting member 2 is in split connection with the connecting part 3, one end, connected with the adjusting member 2, of the mounting column 10 sequentially passes through the upper opening of the metal casing 1 and the mounting hole 15 (the first mounting hole 151 or the second mounting hole 152) on the mounting part 14 and then extends into the accommodating cavity of the mounting part 14 and realizes riveting below the mounting plate 11 after being inserted into the via hole 12 to realize connection with the mounting plate 11, the adjusting member 2, the metal casing 1 and the mounting part 14 are connected together, and the adjusting member 2 is prevented from disengaging from the upper opening of the metal casing 1.

Figure 4:
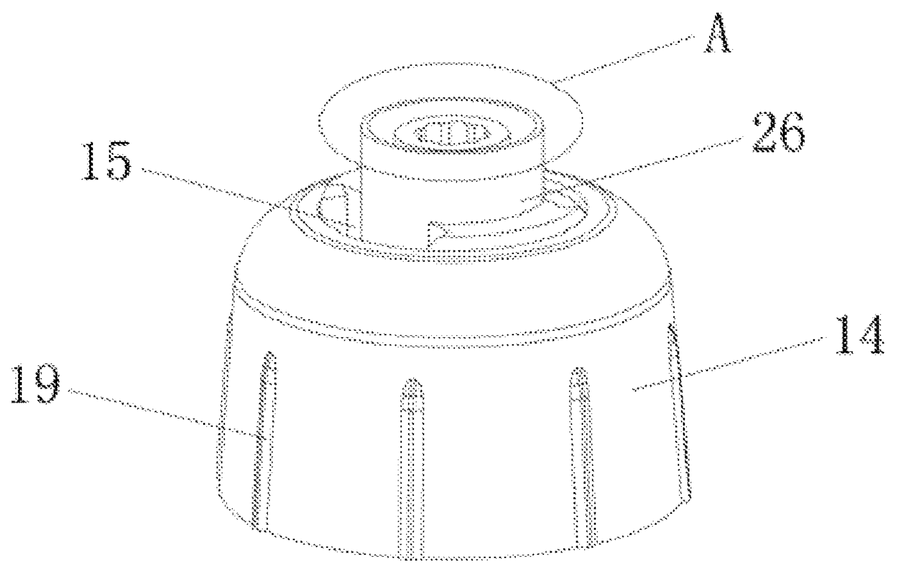
FIG. 4 illustrates a schematic structure diagram of a mounting part of the disclosure.
Figure 5:
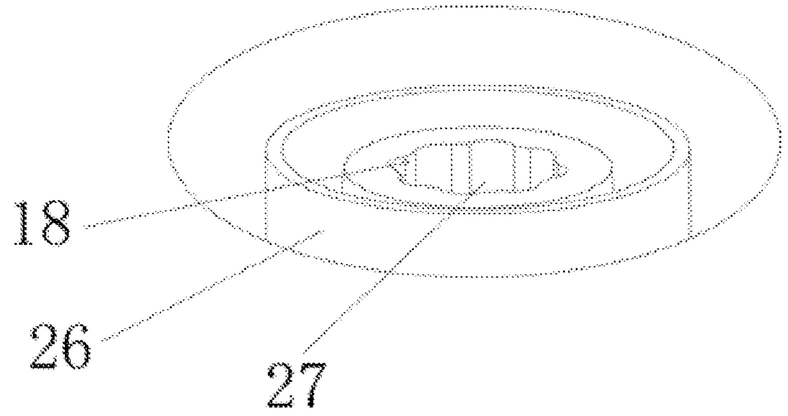
FIG. 5 illustrates an enlarged schematic diagram of A in FIG. 4.
Figure 6:
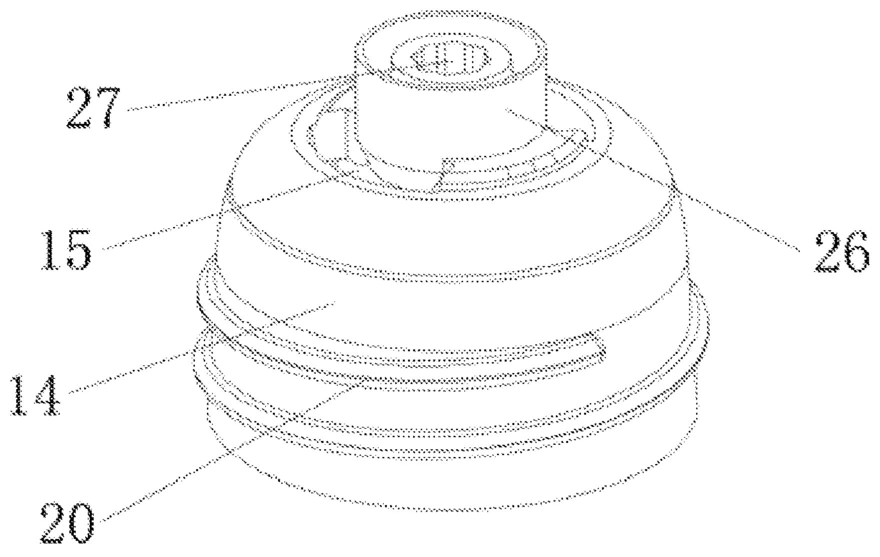
FIG. 6 illustrates another schematic structure diagram of a mounting part of the disclosure.
Figure 16:
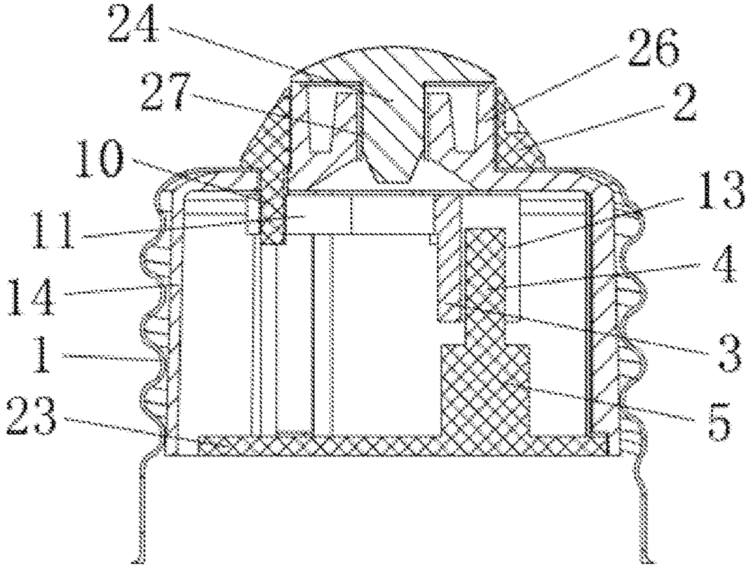
FIG. 16 illustrates a schematic structure diagram of a cross-sectional view in which an adjusting member and a connecting part are split of the disclosure.

As shown in FIGS. 7, 11 and 16, when the mounting part 14 is mounted in the metal casing 1, after the protrusion 26 on the mounting part 14 sequentially passes through the upper opening of the metal casing 1 and the adjusting member 2, the rivet 24 is mounted on the protrusion 26 on the mounting part 14 through the inserting fit between the rivet 24 and the first through hole 27, so that the rivet 24, the adjusting member 2, the metal casing 1 and the mounting part 14 are connected. When the mounting part 14 is mounted in the metal casing 1 through interference fit, one end of the adjusting member 2 is in abutting against the upper opening of the metal casing 1. When the adjusting member 2 rotates, the adjusting member 2 has friction with the upper opening of the metal casing 1, in order to avoid loosening between the metal casing 1 and the mounting part 14 due to friction between the adjusting member 2 and the metal casing 1, a plurality of raised second ribs 19 are disposed on the outer side wall of the mounting part 14 in a circumferential outward symmetrical mode, and the second ribs 19 are vertically disposed, as shown in FIG. 4; by providing the second ribs 19, the frictional resistance between the metal casing 1 and the mounting part 14 is increased, an anti-loosening effect between the metal casing 1 and the mounting part 14 is achieved, and the metal casing 1 and the mounting part 14 are fixedly connected through interference fit. Of course, it is also possible to provide an external thread 20 that is matched with the internal thread inside the metal casing 1 on the outer side wall of the mounting part 14, as shown in FIG. 6, the mounting part 14 is mounted in the metal casing 1 by screwing the external thread 20 and the internal thread inside the metal casing 1, an anti-loosening effect is achieved, and the metal casing 1 and the mounting part 14 are fixedly connected through interference fit.

The outer side wall of the adjusting member 2 is provided with an indicating arrow 21, the metal casing 1 is provided with identifying marks 22 for identifying the color temperature or brightness, the indicating arrow 21 corresponds to the identifying marks 22, namely, when the indicating arrow 21 points to the corresponding identifying mark 22, the current color temperature or brightness is displayed.

As shown in FIGS. 1 and 2, the color temperature identifying marks 22 disposed on the upper part of the metal casing 1 as 30, 40, 50 correspond to color temperatures of 3000 K, 4000 K, 5000 K; when the indicating arrow 21 points to 30, the LED light source displays the color temperature of 3000 K at the moment; when the indicating arrow 21 points to 40, the LED light source displays the color temperature of 4000 K at the moment; and when the indicating arrow 21 points to 50, the LED light source displays the color temperature of 5000 K at the moment.

The brightness identifying marks 22 disposed on the upper part of the metal casing 1 as 30, 50, 80 and 100 correspond to brightness of 30%, 50%, 80% and 100%; when the indicating arrow 21 points to 30, the LED light source displays the brightness of 30% at the moment; when indicating arrow 21 points to 50, the LED light source displays the brightness of 50% at the moment; when the indicating arrow 21 points to 80, the LED light source displays the brightness of 80% at the moment; and when the indicating arrow 21 points to 100, the LED light source displays the brightness of 100% at the moment.

During adjustment, the surface of the side wall of the adjusting member 2 can be turned by hand, so that the indicating arrow 21 points to the corresponding identifying marker 22 for color temperature or brightness adjustment; it is also possible to provide a plurality of longitudinal grooves 25 in the surface of the side walls of the adjusting member 2, the adjusting member 2 is rotated by inserting a tool into the longitudinal grooves 25 so that the indicating arrow 21 points to the corresponding identifying marks 22 for color temperature or brightness adjustment.

In addition to the adjustment of the color temperature or brightness, the LED lamp cap can also perform timing control by means of the switch 5, or perform sensing control by means of the switch 5, or directly control the turning on and turning off of a lamp by means of the switch 5.

The above-mentioned LED lamp cap can be applied to light source products such as a bulb lamp, a PAR lamp, a BR lamp, and a filament lamp.

Finally, it should be noted that the above embodiments are only representative examples of the disclosure. Obviously, the disclosure is not limited to the above-described embodiments, and many variations are also possible. Any simple amendment, equivalent variations and modifications made to the above embodiments in accordance with the technical essence of the disclosure should be considered to fall within the scope of protection of the disclosure.

What is claimed is:

1. A Light Emitting Diode (LED) lamp cap, comprising a metal casing, an adjusting part and a mounting part disposed in the metal casing, wherein the adjusting part comprises an adjusting member disposed on an upper part of the metal casing and a connecting part disposed in the mounting part, the adjusting member is connected with a switch through the connecting part, and the connecting part is configured for rotating by rotating the adjusting member so as to change a gear of the switch to adjust color temperature or brightness or timing or sensing; wherein a first mounting hole is disposed in an outer wall of one end of the mounting part, and the connecting part or one end of the adjusting member passes through the first mounting hole and is configured for rotating along the first mounting hole.

2. The LED lamp cap as claimed in claim 1, wherein one end of the adjusting member is connected with one end of the connecting part, and the other end of the connecting part is connected with a switch handle of the switch.

3. The LED lamp cap as claimed in claim 2, wherein the switch handle of the switch is transversely placed, the other end of the connecting part is disposed with a notch, and the switch handle of the switch is inserted into the notch.

4. The LED lamp cap as claimed in claim 2, wherein the LED lamp cap comprises an adapter, the switch handle of the switch is vertically placed, the switch handle of the switch is sleeved with the adapter, an upper end of the adapter is provided with a groove for inserting the other end of the connecting part, and a lower end of the adapter is provided with a cavity for sleeving the switch handle of the switch.

5. The LED lamp cap as claimed in claim 1, wherein the LED lamp cap comprises a mounting column and a mounting plate, one end of the adjusting member is connected with the mounting column, the connecting part is connected with the mounting plate, and the adjusting member is connected with the connecting part in a manner that the mounting column is connected with the mounting plate.

6. The LED lamp cap as claimed in claim 5, wherein the mounting plate is provided with a via hole matched with one end of the mounting column, and the mounting column is connected with the mounting plate by inserting the mounting column into the via hole.

7. The LED lamp cap as claimed in claim 5, wherein the connecting part is provided with an inserting groove, and the switch handle of the switch is vertically placed and inserted into the inserting groove.

8. The LED lamp cap as claimed in claim 5, wherein the adjusting member is in split connection with the connecting part, one end of the adjusting member is connected with the mounting column to form a whole, the connecting part is connected with the mounting plate to form a whole, the adjusting member is connected with the connecting part in a manner that the mounting column is connected with the mounting plate after passing through a mounting hole in the mounting part.

9. The LED lamp cap as claimed in claim 1, wherein one end of the adjusting member is provided with a plurality of clamping parts, a plurality of second mounting holes are disposed in the outer wall of one end of the mounting part; the plurality of clamping parts are disposed in one-to-one correspondence with the plurality of second mounting holes; an end portion of each of the plurality of clamping parts passes through a corresponding second mounting hole and is abutted against an inner wall of one end of the mounting part, and the plurality of clamping parts are configured for rotating along the plurality of second mounting holes.

10. The LED lamp cap as claimed in claim 1, wherein one end of the adjusting member is provided with a clamping part, a second mounting hole is disposed in the outer wall of one end of the mounting part, an end portion of the clamping part passes through the second mounting hole and is abutted against an inner wall of one end of the mounting part, the clamping part is configured for rotating along the second mounting hole, the connecting part is provided with a clamping block, and the clamping block is abutted against the inner wall of one side of the mounting part.

11. The LED lamp cap as claimed in claim 1, wherein the LED lamp cap comprises a rivet, a center of one end of the mounting part is provided with a protrusion for mounting the rivet, the protrusion is provided with a first through hole, and the rivet is mounted on the mounting part by inserting a lower end of the rivet into the first through hole.

12. The LED lamp cap as claimed in claim 11, wherein a plurality of first ribs protruded relative to an inner wall of the first through hole are disposed on the inner wall of the first through hole in a circumferential inward symmetrical mode, and the plurality of first ribs are vertically disposed.

13. The LED lamp cap as claimed in claim 1, wherein the mounting part is mounted in the metal casing in an interference fit manner.

14. The LED lamp cap as claimed in claim 13, wherein a plurality of second ribs protruded relative to an outer side wall of the mounting part are disposed on the outer side wall of the mounting part in a circumferential outward symmetrical mode, and the plurality of second ribs are vertically disposed.

15. The LED lamp cap as claimed in claim 1, wherein the outer side wall of the mounting part is provided with an external thread, and the mounting part is mounted in the metal casing by screwing the external thread with an internal thread in the metal casing.

16. The LED lamp cap as claimed in claim 1, wherein the outer side wall of the adjusting member is provided with an indicating arrow, the metal casing is provided with identifying marks for identifying color temperature or brightness or timing or sensing, and the indicating arrow is corresponded to the identifying marks.

17. The LED lamp cap as claimed in claim 1, wherein the switch is mounted on a drive power strip or on an adapter plate that is electrically connected with the drive power strip by a pin or wire.

18. The LED lamp cap as claimed in claim 1, wherein one end of the adjusting member is connected with one end of the connecting part to form a whole, the adjusting member is in integral connection with the connecting part, the connecting part is of an arc-shaped structure adapting to the first mounting hole; the other end of the connecting part passes through the first mounting hole to be connected with a switch handle of the switch.

19. The LED lamp cap as claimed in claim 1, the adjusting part and the mounting part are all made of an insulating material.

* * * * *